United States Patent [19]
Yoshioka

[11] Patent Number: 6,141,307
[45] Date of Patent: Oct. 31, 2000

[54] OPTICAL DISK DISCRIMINATING APPARATUS

[75] Inventor: You Yoshioka, Yokohama, Japan

[73] Assignee: Kabushiki Kaisha Toshiba, Kawasaki, Japan

[21] Appl. No.: 09/084,401

[22] Filed: May 27, 1998

[30] Foreign Application Priority Data

May 27, 1997 [JP] Japan ................................. 9-136839

[51] Int. Cl.[7] ....................................................... G11B 3/90
[52] U.S. Cl. ............................................................. 369/58
[58] Field of Search ................................. 369/58, 54, 94

[56] References Cited

U.S. PATENT DOCUMENTS

| | | | |
|---|---|---|---|
| 5,745,460 | 4/1998 | Tateishi | 369/58 |
| 5,764,610 | 6/1998 | Yoshida et al. | 369/58 |
| 5,903,531 | 5/1999 | Satoh et al. | 369/58 |
| 5,966,357 | 10/1999 | Ryoo | 369/58 |
| 5,974,014 | 10/1999 | Tajiri | 369/58 |

*Primary Examiner*—Thang V. Tran
*Attorney, Agent, or Firm*—Pillsbury Madison & Sutro LLP

[57] ABSTRACT

The present invention is directed to an optical disk playing system on which plural types of optical disks different in information recording density are selectively mounted and which reproduces information recorded on the mounted optical disk by means of an optical pickup. The type of the mounted optical disk is discriminated in accordance with an output of the optical pickup obtained in a state where the mounted optical disk is rotated.

5 Claims, 4 Drawing Sheets

CD FOCUS ERROR SIGNAL LEVEL

SINGLE-LAYER DVD FOCUS ERROR SIGNAL LEVEL

TOTAL REFLECTION SIGNAL LEVEL

TOTAL REFLECTION SIGNAL LEVEL

CD-RW FOCUS ERROR SIGNAL LEVEL

DOUBLE-LAYER DVD FOCUS ERROR SIGNAL LEVEL

TOTAL REFLECTION SIGNAL LEVEL

TOTAL REFLECTION SIGNAL LEVEL

OPTICAL DISK DISCRIMINATING APPARATUS

BACKGROUND OF THE INVENTION

The present invention relates to an optical disk playback system for selectively playing back information on plural types of optical disks, and more particularly, to an improvement of an optical disk discriminating apparatus for automatically discriminating the type of an optical disk mounted therein.

As is well known, not only sound data, but also moving picture data has been compressed on, for example, an optical disk whose diameter is 12 cm. This is the same diameter as a sound CD (Compact Disk). For example, a CD-ROM (Read Only Memory) and the like are used widely in the fields of education to store information.

Further, an optical disk generally called a DVD, which has the same diameter as that of a CD, has been developed, which encodes encode by compression and stores moving picture data corresponding to a movie of about two hours, sound data of eight different languages, and sub-picture data showing captions in thirty two different languages.

For this reason, it is requested now to develop an optical disk playback system of a CD/DVD convertible type which allows a CD and a DVD to be selectively mounted therein and played back on a system for playing back an optical disk. In this type of an optical disk playback system it is necessary to automatically discriminate whether a CD on a DVD is mounted therein, and switch the state of the optical system and the electric processing system to a state corresponding to the CD or the DVD.

A conventional optical disk discriminating apparatus for automatically discriminating between a CD and a DVD as described above, allows its optical pickup to execute the focus search operation to forcefully move an objective lens from its initial position, while stopping rotation of the mounted optical disk. In accordance with a focus error signal obtained during the focus search operation, and a total reflection signal obtained by photolectrically converting total reflection light from the optical disks the apparatus determines whether the mounted optical disk is a CD or a DVD.

That is, FIG. 1 shows waveforms of focus error signals and total reflection signals obtained when the focus search operation is executed for four different types of optical disks, for example, a CD, a CD-RW (ReWritable), a single-layer DVD and a double-layer DVD. Since signal waveforms associated with these types of optional disks have unique forms levels, it is possible to determine the type of the optical disk by referring to these characteristics.

A focus error signal and a total reflection signal of, for example, a CD, will be considered as reference. Differences between a CD and a single-layer DVD cannot be determined since the focus error signal level of the single-layer DVD is substantially the same as that of the CD, but slight differences can be determined since the total reflection signal level thereof is only half as high as that of the CD. Therefore, when the focus error signal level is not low but the total reflection signal level is low, it is possible to determine that the that has a high possibility of being a single-layer DVD at high possibility.

In the case of the CD-RW, both the focus error signal level and the total reflection signal level are about one third as high as those of the CD. However, since the focus error signal level and the total reflection signal level of the double-layer DVD are also comparably lower to those of the CD-RW, it is only possible to determine that the optical disk is not a CD or a single-layer DVD with reference to the only signal levels.

For this reason, discrimination between the CD-RW and the double-layer DVD needs to be executed by considering in combination the characteristic that the number of the S letter properties of the focus error signal is different (one in the CD-RW, and two in the double-layer DVD) and the characteristic that the total reflection signal level of the double-layer DVD is higher than that of the CD-RW.

When the type of the optical disk is determined in this manner, for example, the optical system of the optical pickup and the operation mode of the signal processing system are changed in response to the results of the determination, in the optical disk playback system.

In the above-described conventional optical disk discriminating apparatus, however, laser light is concentrated at one point of the optical disk surface since the focus search operation is executed in a state in which the optical disk is stopped. Therefore, in the optical disk whose data can be rewritten such as a DVD-RAM (Random Access Memory), a problem arises that writing is executed at a point where the light is concentrated, with intensity of the laser light irradiated from the optical pickup for the playback.

Further, in the conventional optical disk discriminating apparatus, the focus search operation is executed to produce a focus error signal and a total reflection signal, and the type of the optical disk is determined on the basis of the signal waveform and the level. Therefore, another problem arises in that variations in the waveform, the level of the produced focus error signal, and the total reflection signal, which are generated by scratch and contamination on the optical disk, may cause an erroneous determination.

In this case, if the tracking servo of three beams for a CD is applied to, for example, a DVD, by erroneously determining the type of the optical disk, the correct beam pitches are not applied, and only direct current offset may be unnecessarily output from the optical pickup. In this situation, large current flows to a tracking actuator coil for moving the objective lens in the tracking direction, which is very dangerous.

Moreover, some of the conventional optical disk playback systems include a measurement of protection that even if the optical system and the electric processing system are erroneously set based upon erroneously determining the type of the optical disk. When a the information from the optical disk is incorrectly read for a predetermined period, it is judged that the optical disk has been discriminated erroneously determined. As a result, optical system and the electric processing system are changed to other systems.

However, even if such protection is provided, probability of an erroneous determination of the optical disk is not lowered. Therefore, inconvenience and a waste of time occurs each time the erroneous discrimination is made.

BRIEF SUMMARY OF THE INVENTION

The present invention has been accomplished in consideration of the above circumstances, and provides an optical disk discriminating apparatus which can accurately determine the type of an optical disk mounted therein in a short amount of time, without unnecessarily writing on a rewritable optical disk.

The optical disk discriminating apparatus according to the present invention is directed to an optical disk playback system which has plural types of optical disks different in the information recording density mounted selectively therein and which plays back the information stored in the mounted optical disks by means of an optical pickup. The system discriminates the type of the mounted optical disk on the basis of an output of the optical pickup obtained in a state in which the mounted optical disk is rotated.

With the above-described structure, since the type of the mounted optical disk is discriminated on the basis of the output of the optical pickup which can be obtained in a state in which the mounted optical disk is rotated, it is possible to prevent unnecessary writing on the rewritable optical disk and accurately determine the type of the mounted optical disk exactly in a short amount of time.

Additional advantages of the invention will be set forth in the description which follows, and in part will be obvious from the description, or may be learned by practice of the invention. The object and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1A:
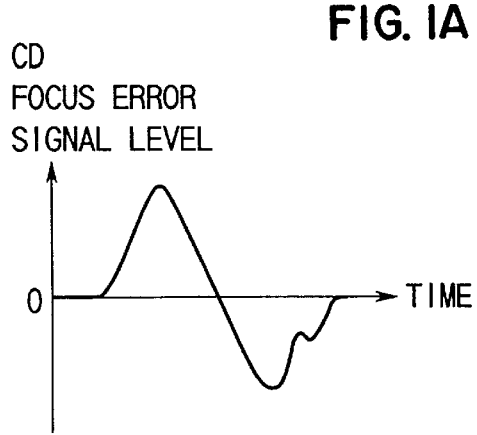
FIG. 1 is a graph explaining differences between a focus error signal and a total reflection signal in waveform and level, in accordance with the type of an optical disk.
Figure 1B:
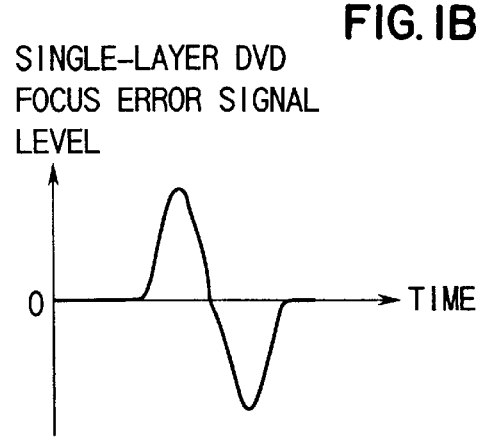
Figure 1C:
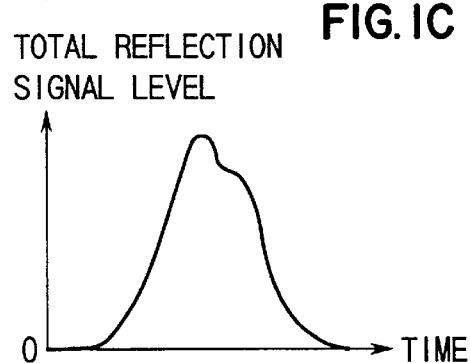
Figure 1D:
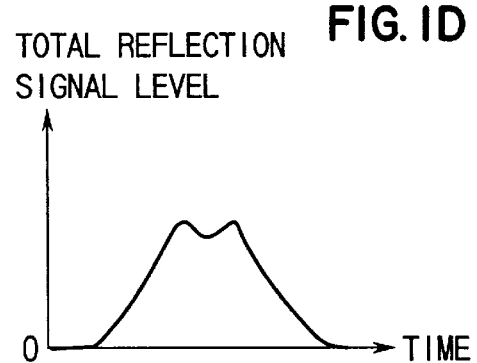
Figure 1E:
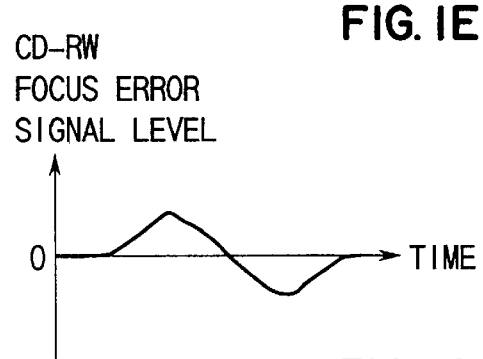
Figure 1F:
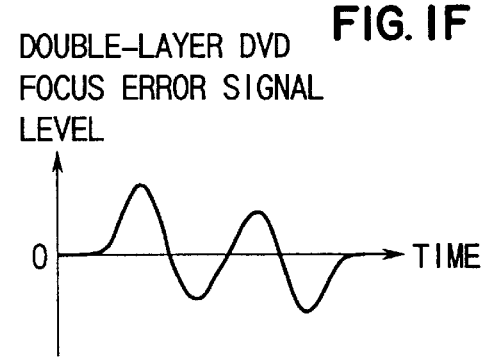
Figure 1G:
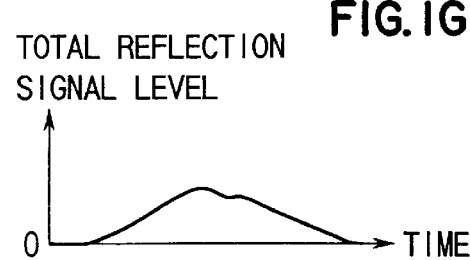
Figure 1H:
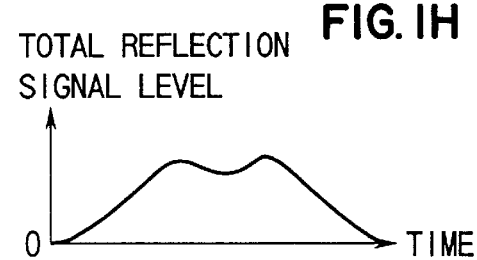
Figure 2:
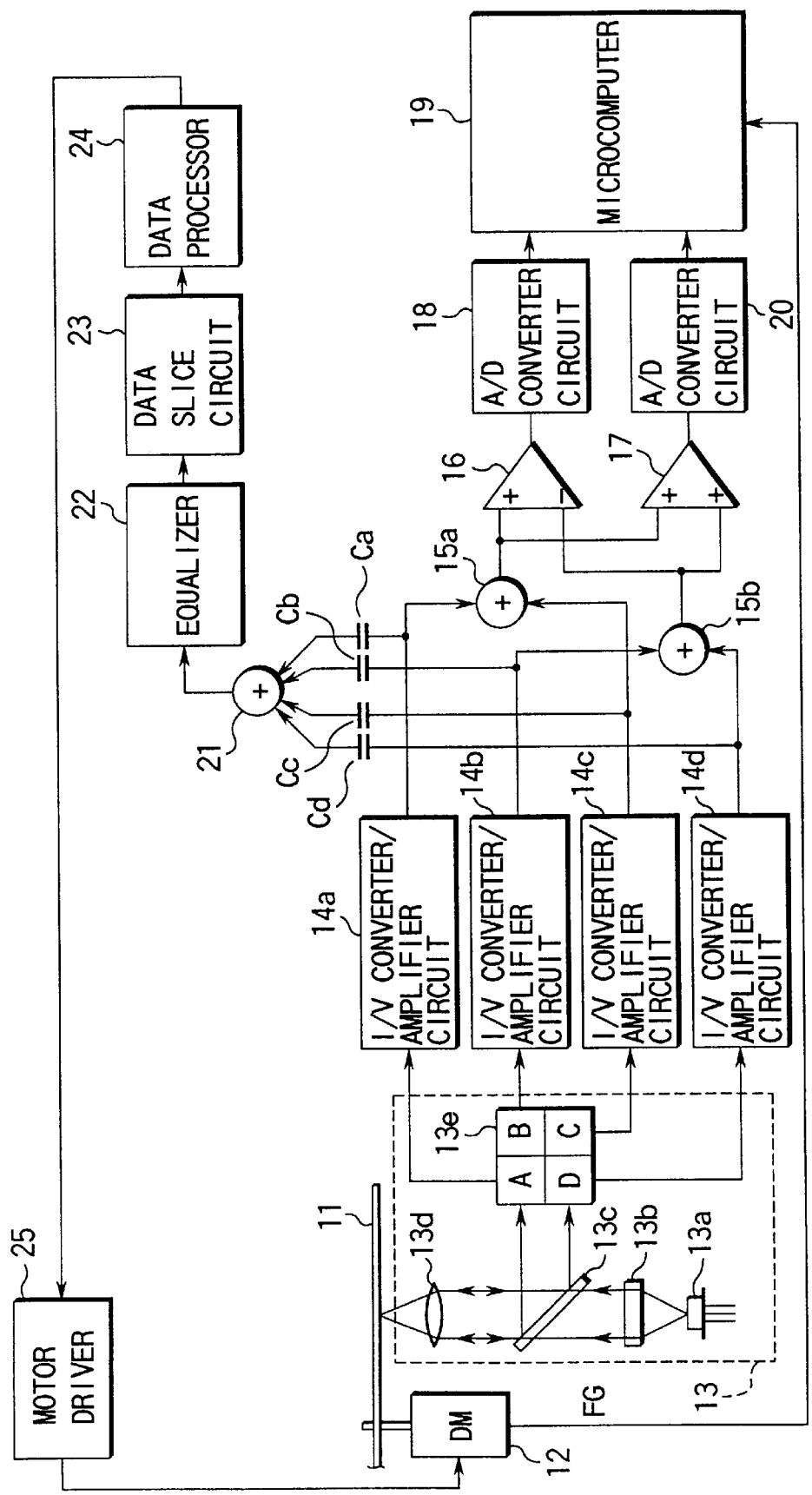
FIG. 2 is a block diagram explaining a first aspect of an optical disk discriminating apparatus according to the present invention.

A first aspect of the present invention will be described below in detail with reference to the drawings. In FIG. 2, reference symbol 11 denotes an optical disk, which can be various kinds of disks, for example, a CD, a CD-RW, a single-layer DVD, a double-layer DVD or a DVD-RAM. This optical disk 11 is rotated at a predetermined rate by a disk motor 12.

An optical pickup 13 is disposed at the signal recording surface side of the optical disk 11. The optical pickup 13 is supported so as to be movable in a tracking (radial) direction of the optical disk 11 by a driving force of a pickup feeding motor (not shown).

After allowing illumination light from a semiconductor laser 13a to pass through various optical systems such as a collimator lens 13b and a deflection beam splitter 13c, the optical pickup 13 introduces the light into an objective lens 13d and thereby collects light on the signal recording surface of the optical disk 11.

Further, the optical pickup 13 changes the direction of the light reflected from the optical disk 11 at approximately right angles by the deflection beam splitter 13c, allows the light to be received by a quarter photo-detector 13e, and photo-electrically converts the light in four light receiving areas A, B, C and D thereof.

In the quarter photo-detector 13e, the aligning direction of the light receiving areas A and B, and C and D, i.e. the lateral direction of the drawing corresponds to the tracking direction of the optical disk 11, and the aligning direction of the light receiving areas A and D, and B and C, i.e. the longitudinal direction of the drawing corresponds to the information track row direction formed on the optical disk 11.

Current signals output from the four respective light receiving areas A, B, C and D of the quarter photo-detector 13e are converted to voltage signals by I/V (current/voltage) converter/amplifier circuits 14a, 14b, 14c and 14d, respectively. Outputs of the I/V converter/amplifier circuits 14a and 14c are added by an adder circuit 15a, and outputs of the I/V converter/amplifier circuits 14b and 14d are added by an adder circuit 15b.

Outputs of the adder circuits 15a and 15b are supplied to a subtracter circuit 16 and a total adder circuit 17, respectively. The subtracter circuit 16 subtracts the output of the adder circuit 15b from the output of the adder circuit 15a and generates a focus error signal corresponding to the focus shifting to the optical disk 11 surface of the objective lens 13d.

The focus error signal, which is output from the subtracter circuit 16, is used for focus servo keeping the objective lens 13d at the focusing position, is supplied to an A/D (Analogue/Digital) converter 18 and thereby digitized, and the digitized signal is supplied to a microcomputer 19.

The total adder circuit 17 generates a total addition signal corresponding to the information recorded on the optical disk 11 by totally adding the outputs of the adder circuits 15a and 15b. This total addition signal is supplied to an A/D converter circuit 20 and thereby digitized, and the digitized signal is supplied to the microcomputer 19.

When the microcomputer 19 is requested to discriminate the kind of the mounted optical disk 11, the microcomputer 19 rotates the optical disk 11 at a predetermined rate by driving the disk motor 12 and also allows execution of the focus searching operation, which causes the objective lens 13d to be moved forcefully from its initial position in the focusing direction. The microcomputer 19 discriminates the kind of the mounted optical disk 11 on the basis of the total addition signal and the focus error signal supplied during the focus searching operation. The details will be described later.

The outputs of the I/V converter/amplifier circuits 14a, 14b, 14c and 14d become read channel RF (Radio Frequency) signals by allowing an adder circuit 21 to add high range components extracted by capacitors Ca, Cb, Cc and Cd respectively to the outputs of the I/V converter/amplifier circuits 14a, 14b, 14c and 14d. The read channel RF signals are demodulated by being supplied to a data processor 24 via an equalizer circuit 22 and a data slice circuit 23.

Discrimination of the kind of the optical disk 11 will be described now. First, the microcomputer 19 allows the optical disk 11 to be rotated and also allows the objective lens 13d to execute the focus searching operation. In accordance with the total addition signal and the focus error signal obtained as a result of the operation, the microcomputer 19 discriminates the kind of the mounted optical disk 11, and sets the operation parameter of the focus servo for the objective lens 13d on the basis of results of the discrimination.

After that, in accordance with the operation parameter thus set, microcomputer 19 controls to execute the focus servo to the objective lens 13d. For this reason, the signal whose laser light collected on the signal recording surface of the optical disk 11 by the objective lens 13d crosses the formed tracks, is output from the adder circuit 21 as the read channel RF signal.

After passing through the equalizer circuit 22, the read channel RF signal is binarized by the data slice circuit 23. In this case, the characteristics of the equalizer circuit 22 are set to correspond to the high range of the read channel frequency so that the obtained read channel RF signal cannot be attenuated in the high range even if the optical disk 11 is in any expected kind.

In this state, since the tracking servo is not executed even for the objective lens 13d, unlike the normal play of the optical disk 11, noise between the tracks is input to the data slice circuit 23. For this reason, the data slice circuit 23 is controlled not to execute the data slice operation when the laser light is positioned between the tracks and the amplitude of the read channel RF signal becomes smaller.

This control can be realized, for example, by enlarging the hysteresis of the slice threshold value at the rise edge and the fall edge of the read channel RF signal, or by the means wherein the slice threshold value is fixed in advance at the central potential in the amplitude of the read channel RF signal at the on-tracking operation of the laser light so that the potential of the read channel RF signal can exceed the slice threshold value to stop the output when the direct current potential on the large mirror surface between the tracks rises.

The read channel RF signal binarized by the data slice circuit 23 is supplied to the data processor 24. The data processor 24 controls the rotation rate of the disk motor 12, i.e. the rotation rate of the optical disk 11 via a motor drive circuit 25 so as to keep the frequency of the read channel RF signal constant on the basis of the binarized signal thus input.

The variation of the frequency of the read channel RF signal obtained at this time is large since the tracking servo is not operated. For this reason, it is effective to lower the control band about the control of the rotation rate of the disk motor 12.

As for the frequency of the read channel RF signal that is to be a control target of the rotation rate of the disk motor 12, a value which can be near the rotation rate obtained when the optical disk 11 is actually played, is preset as a fixed value.

When the rotation rate of the optical disk 11 is controlled in the manner described above, so that the frequency of the read channel RF signal can be a predetermined target value, the optical disk 11 having the high information recording density such as a DVD is rotated at a rate lower than that of the optical disk 11 having the low information recording density such as a CD.

For this reason, the microcomputer 19 can discriminate the difference between a CD and a DVD by detecting the difference in the rotation rate. In this case, since the disk motor 12 has a function of generating an FG signal proportional to the rotation frequency, the microcomputer 19 can detect the difference in the rotation rate of the optical disk 11 by measuring the cycle of the FG signal.

According to the above-described first aspect, since the optical disk 11 is rotated to execute the focus search operation, it is possible to prevent unnecessary writing from being executed on the rewritable optical disk 11.

In addition, since the rotation rate of the optical disk 11 is controlled so as to set the frequency of the read channel RF signal read from the optical disk 11 at a predetermined target value and it is discriminated whether the optical disk 11 is a CD or a DVD on the basis of the rotation rate of the optical disk 11, it is possible to discriminate the kind of the optical disk 11 more exactly than a method using the focus error signal and the total addition signal as seen in the prior art.

Figure 3:
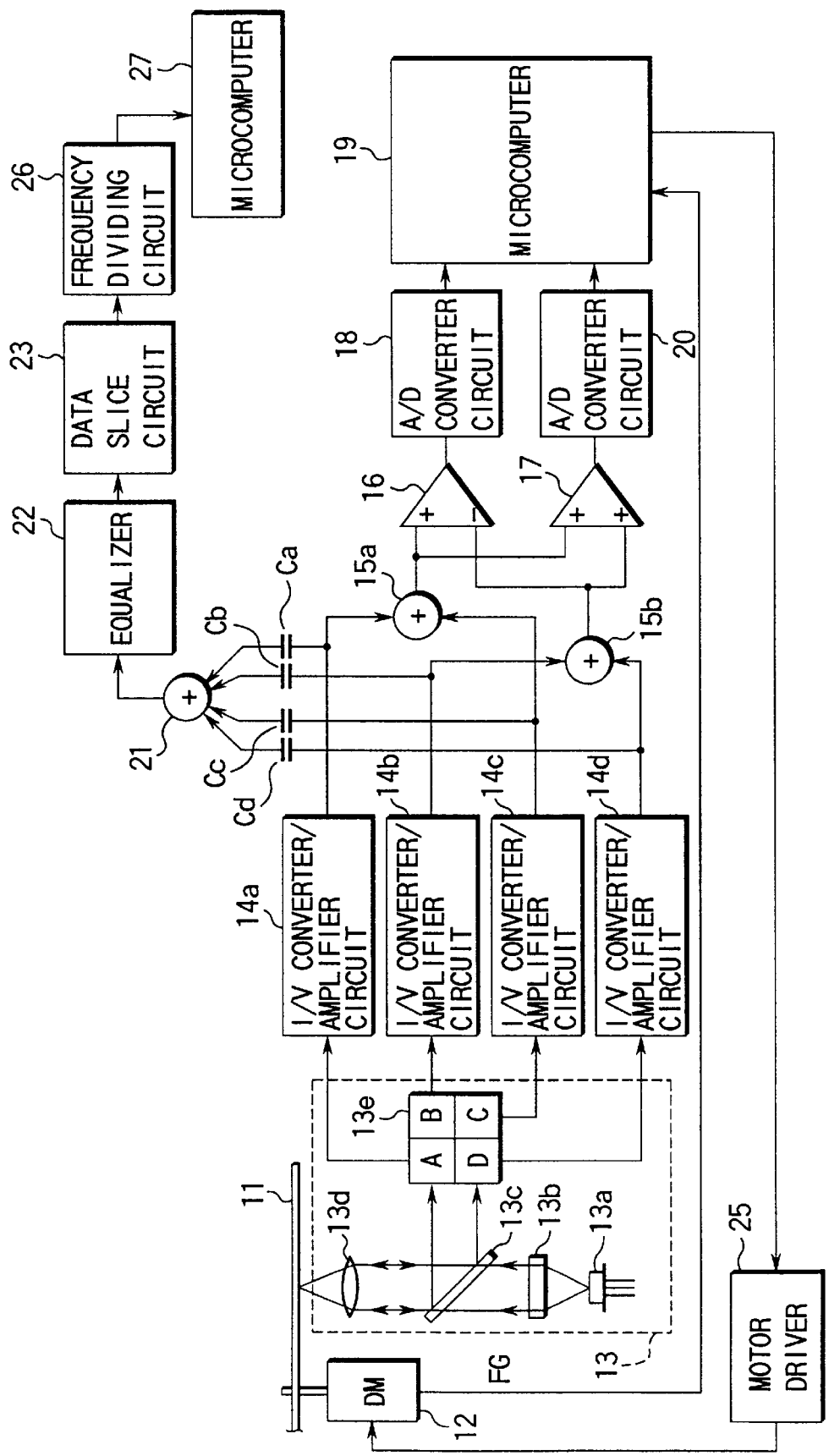
FIG. 3 is a block diagram explaining a second aspect of an optical disk discriminating apparatus according to the present invention.

Next, FIG. 3 shows a second aspect of the present invention, and the same portions as those of FIG. 2 are denoted by the same reference symbols. That is, the microcomputer 19 controls the rotation rate of the optical disk 11 via the motor drive circuit 25 so that the cycle of the FG signal obtained from the disk motor 12 can be the preset cycle, i.e. the rotation rate of the optical disk 11 can be constant.

When the rotation rate of the optical disk 11 is controlled to be constant in this manner, the frequency of the read channel RF signal binarized by the data slice circuit 23 becomes higher in the case of the optical disk 11 having the high information recording density such as a DVD, and becomes lower in the case of the optical disk 11 having the low information recording density such as a CD.

For this reason, a DVD and a CD can be discriminated by frequency-dividing the read channel RF signal binarized by the data slice circuit 23 by use of a frequency divider circuit 26, and supplying the signal to a microcomputer 27 to detect the height of the frequency. Even in this second aspect, the same advantage as that of the first aspect can be obtained.

Figure 4:
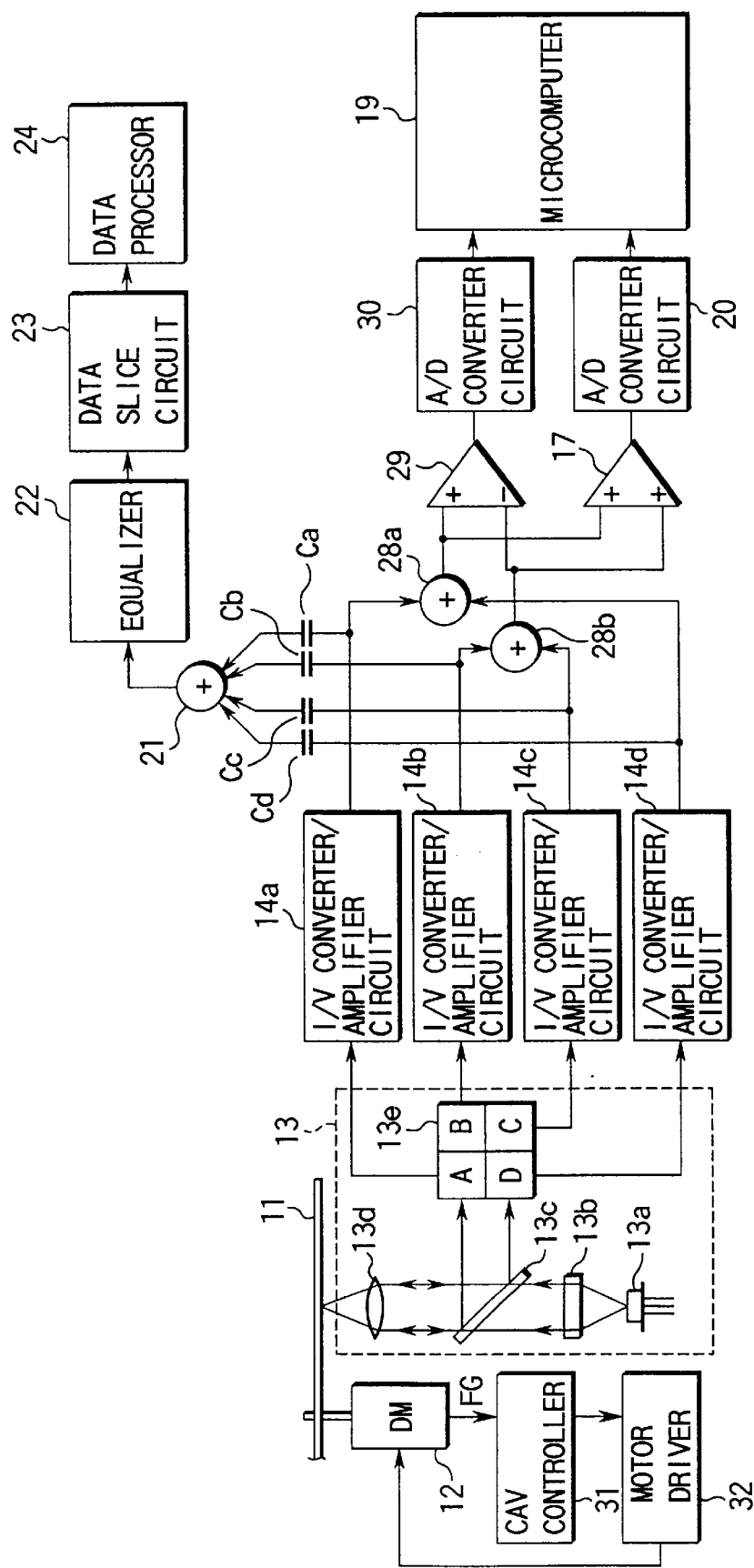
FIG. 4 is a block diagram explaining a third aspect of an optical disk discriminating apparatus according to the present invention.

Next, FIG. 4 shows a third aspect of the present invention, and the same portions as those of FIG. 2 are denoted by the same reference symbols. That is, the outputs of the I/V converter/amplifier circuits 14a and 14d are added by an adder circuit 28a, and the outputs of the I/V converter/amplifier circuits 14b and 14c are added by an adder circuit 28b.

The outputs of the adder circuits 28a and 28b are supplied respectively to a subtracter circuit 29 and the total adder circuit 17. The subtracter circuit 29 generates a tracking error signal corresponding to the position shifting in the tracking direction to the information track row of the objective lens 13d, by subtracting the output of the adder circuit 28b from the output of the adder circuit 28a.

The tracking error signal, which is output from the subtracter circuit 29, is used for the tracking servo which allows the objective lens 13d to follow the information track row. The signal is also supplied to the microcomputer 19 after supplied to an A/D converter circuit 30 and thereby digitized.

The total adder circuit 17 generates a total addition signal corresponding to the information recorded on the optical disk 11 by totally adding the outputs of the adder circuits 28a and 28b. This total addition signal is supplied to the microcomputer 19 after supplied to the A/D converter circuit 20 and thereby digitized.

The FG signal, which is output from the disk motor 12, is supplied to a CAV (Constant Angular Velocity) controller 31. The CAV controller 31 controls the disk motor 12 via a motor driver 32 so as to rotate the optical disk 11 with the predetermined rotation number and at the constant angular rate on the basis of the FG signal thus input.

For this reason, the microcomputer 19 can recognize the level of the tracking error signal during the rotation of the optical disk 11, and the level of the total reflection signal. In addition, since the read channel RF signal, which is output from the adder circuit 21, reaches the data processor 24, it can be demodulated.

When the kind of the optical disk 11 is discriminated, he microcomputer 19 observes the tracking error signal and the total reflection signal under the condition that the optical disk 11 is rotated at a constant angular rate and with a predetermined rotation number and is not processed in the tracking servo. If the diameter of the beam spot of the laser light collected on the optical disk 11 surface is selected to a size optimal to an optical disk 11 having a wide track pitch such as a CD, the tracking error signal is almost at the low level when the optical disk 11 having a small track pitch such as a DVD is mounted.

This difference in the level of the tracking error signal influences not only to the track pitch, but also the reflectivity. However, the light reflectivity can be detected on the basis of the total reflection signal, and therefore, even in the case of an optical disk 11 such as a CD-RW, whose tracking error signal level is low since the tracking pitch is the same as that of a CD but the light reflectivity is lower than a CD, it can be detected that the track pitch is as wide as that of a CD.

Shown below is a difference in the track pitch, the tracking error signal level and the total reflection signal level among a CD, a CD-RW, a DVD-ROM and a DVD-R.

|  | TRACK PITCH | TRACKING ERROR SIGNAL LEVEL | TOTAL REFLECTION SIGNAL LEVEL |
| --- | --- | --- | --- |
| CD | 1.6 $\mu$m | LARGE | LARGE |
| CD-RW | 1.6 $\mu$m | MIDDLE | MIDDLE |
| DVD-ROM | 0.8 $\mu$m | SMALL | LARGE |
| DVD-R | 0.8 $\mu$m | EXTREMELY SMALL | MIDDLE |

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An optical disk discriminating apparatus in an optical disk playback system, the optical disk playback system (i) having a plurality of types of optical disks selectively mounted thereon, each mounted optical disk having a different information recording density, and (ii) configured to reproduce information recorded on said optical disk by means of an optical pickup, the apparatus comprising:

discriminating means for discriminating a type of said optical disk in accordance with a frequency of a signal read from said optical disk by said optical pickup and in accordance with a rotation rate of said optical disk, the signal having been read during a state where said optical disk is rotated and where a tracking servo is not applied to an objective lens of said optical pickup.

2. The optical disk discriminating apparatus according to claim 1, wherein said discriminating means comprises:

rotation rate control means for controlling the rotation rate of said mounted optical disk, so that the frequency of the signal read from said optical disk can be a preset value; and type discriminating means for measuring the rotation rate of said optical disk having the controlled rotation rate, and for discriminating the type of said optical disk based upon results of the measuring.

3. The optical disk discriminating apparatus according to claim 1, wherein said discriminating means comprises:

rotation controlling means for rotating said optical disk at a constant, preset rotation rate; and type discriminating means for (i) measuring the frequency of the signal read from said optical disk while said optical disk is rotated at the constant rotation rate, and (ii) discriminating the type of said optical disk based upon results of the measuring.

4. An optical disk discriminating apparatus in an optical disk playback system, the optical disk playback system (i) having a plurality of types of optical disks selectively mounted thereon, each mounted optical disk having a different information recording density, and (ii) configured to reproduce information recorded on said optical disk by means of an optical pickup, the apparatus comprising:

rotation controlling means for rotating said optical disk at a constant, preset rotation rate; and type discriminating means for measuring a level of a signal read by said optical pickup from said optical disk rotated at the constant rotation rate, and for discriminating a type of said optical disk (i) based upon the rotation rate and results of the measuring, and (ii) in a state where a tracking servo is not applied to an objective lens of said optical pickup.

5. The optical disk discriminating apparatus according to claim 4, wherein said type discriminating means measures a total reflection signal level and a tracking error signal level generated from the signal of said optical pickup.

* * * * *